July 13, 1948.

M. A. CLARK 2,444,977

LAND LEVELER

Filed Nov. 13, 1945

INVENTOR
M. A. Clark

BY Webster & Webster
ATTORNEYS

July 13, 1948.  M. A. CLARK  2,444,977
LAND LEVELER
Filed Nov. 13, 1945  2 Sheets-Sheet 2
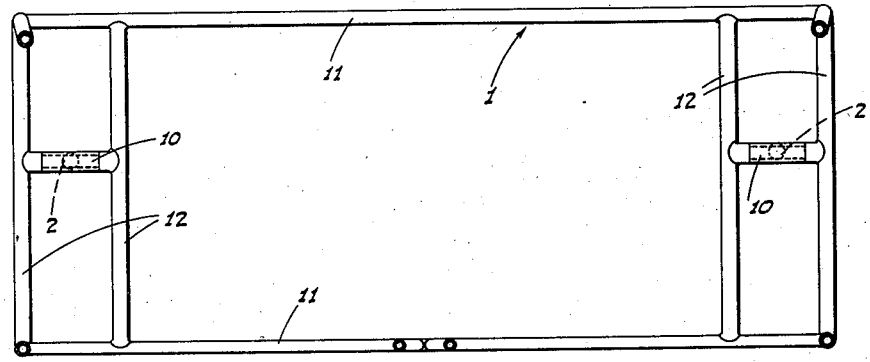
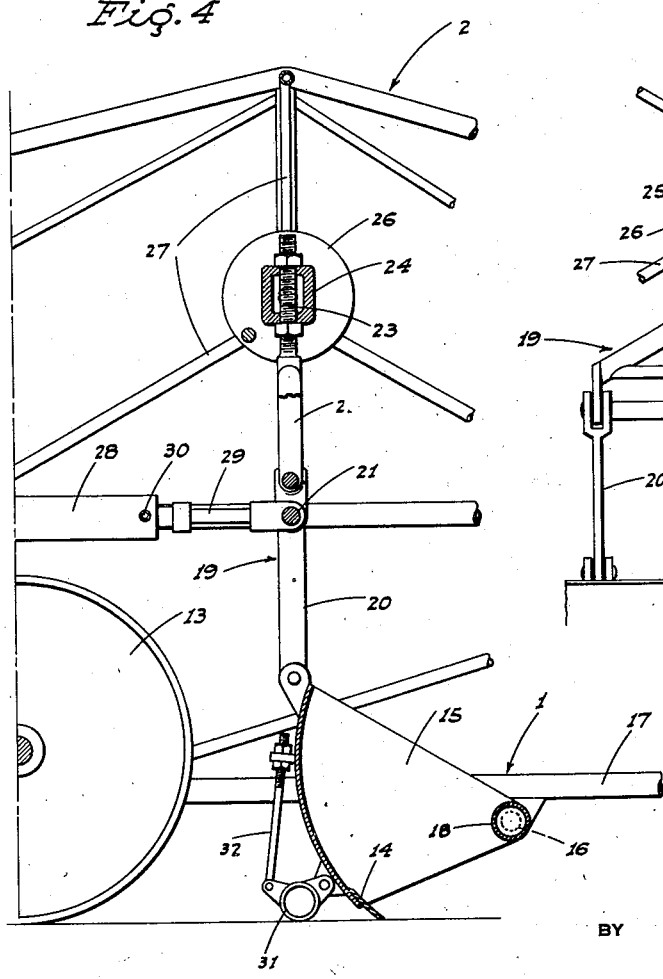
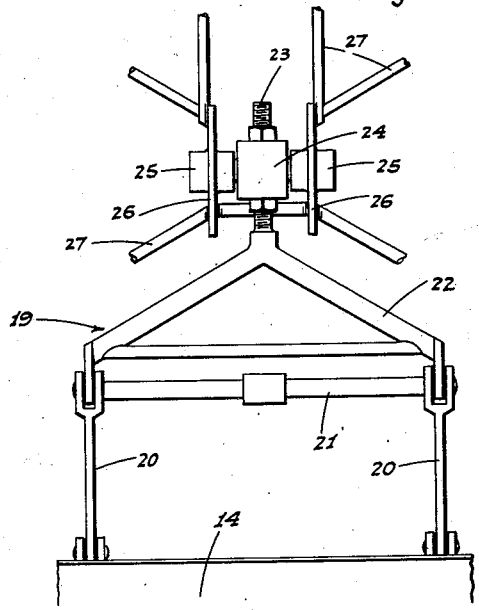
INVENTOR
M. A. Clark
BY
ATTORNEYS Patented July 13, 1948

2,444,977

UNITED STATES PATENT OFFICE 2,444,977

LAND LEVELER

Marion A. Clark, Tulare, Calif., assignor, by direct and mesne assignments, to Albert G. Gurries, Gilroy, Calif.

Application November 13, 1945, Serial No. 628,227

13 Claims. (Cl. 37—153)

This invention relates in general to an improved, tractor-drawn land leveler of the type known as a drag or finish leveler, and which comprises an elongated wheel-supported frame assembly from which an earth working or scraping blade is suspended intermediate the ends of said frame assembly.

One object of the present invention is to provide a land leveler of novel construction, and which is operative to accomplish effective and accurate finish leveling with a minimum of adjustment of the blade; the implement being designed so that when the supporting wheels traverse humps or the like, there is not a corresponding upward movement of the blade, but on the contrary the blade remains substantially in the horizontal cutting plane for which it is set. This is a feature which assures of accurate leveling operations.

Another object of the invention is to provide a land leveler, as in the preceding paragraph, which comprises an elongated front frame section which is wheel-supported at opposite ends and arranged to couple to a tractor, and an elongated rear frame section wheel supported at its rear end and vertically swingably hinged at its front end to the front frame section intermediate the ends of the latter; the earth working blade being pivotally mounted on the front frame adjacent its rear wheels, and an adjustable connecting unit extending between the blade rearwardly of its pivotal axis, and the rear frame above the bowl. By reason of the above hinged arrangement of the frame sections, and particular mounting of the blade, the latter is not responsive in any substantial degree to variation in ground contour as traversed by the implement wheels.

A further object of the invention is to provide a simple and inexpensive land leveler, and yet one which will be exceedingly effective for the purpose for which it is designed.

These objects are accomplished by means of such structure and relative arrangement of parts as will fully appear by a perusal of the following specification and claims.

In the drawings similar characters of reference indicate corresponding parts in the several views:

Figure 3 is an enlarged cross section on line 3—3 of Fig. 1.

Figure 4 is an enlarged fragmentary sectional elevation on line 4—4 of Fig. 2.

Figure 5 is a fragmentary transverse elevation of the adjustable connecting unit, as coupled between the rear frame section and the earth working scraper.

Figure 1:
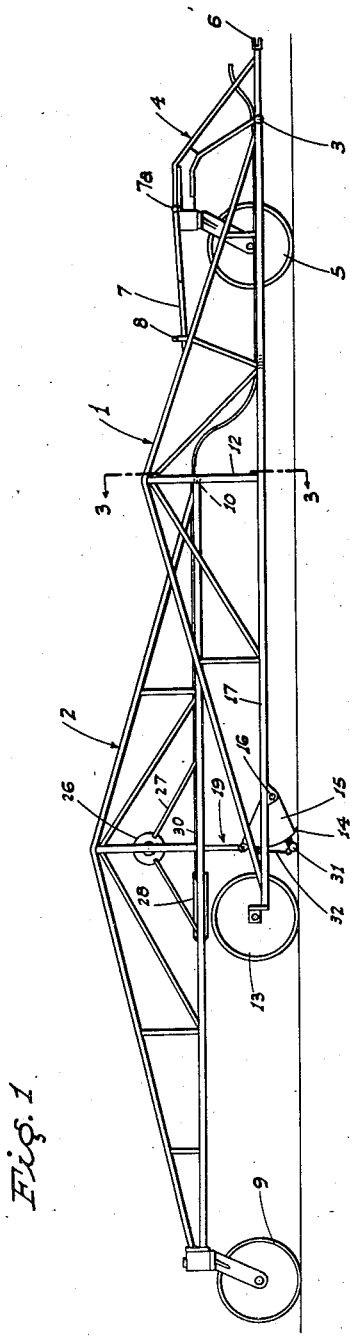
Figure 1 is a side elevation of the implement as in use.
Figure 2:
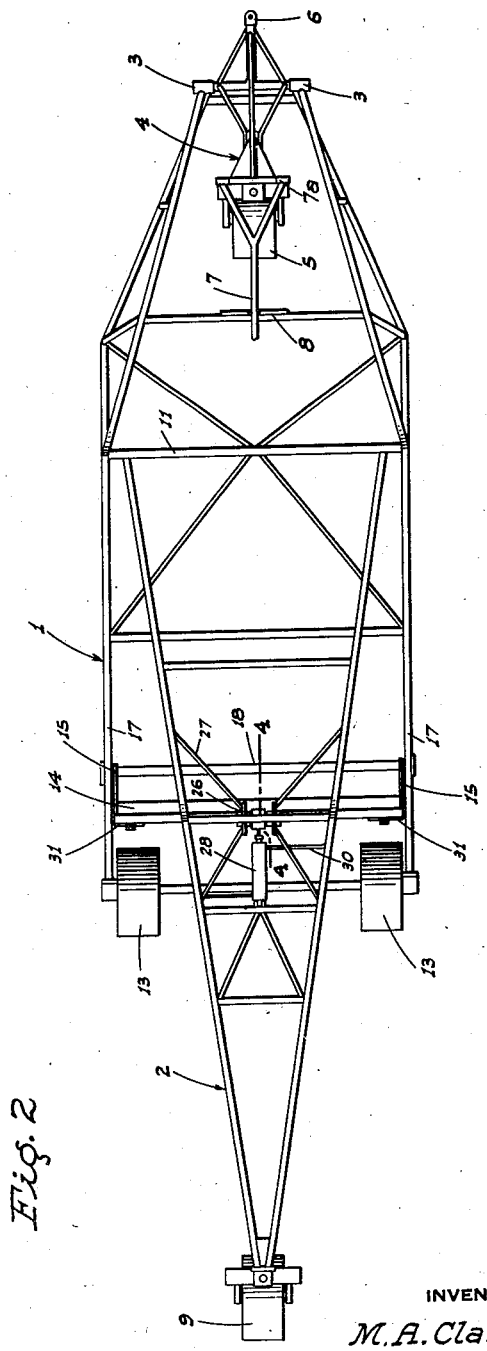
Figure 2 is a plan view of the same.

Referring now more particularly to the characters of reference on the drawings, the implement comprises a trussed front frame section, indicated generally at 1, and a trussed rear frame section, indicated generally at 2.

The front frame section 1 is of substantial width, except at its forward end portion, where it tapers forwardly and is vertically swingably hinged, at transversely spaced points, as at 3, in connection with a draft truck 4, which includes a single caster wheel 5, and a hitch 6 adapted to be coupled to a tractor. A limit or guide rod 7 extends rearwardly from the draft truck 4 and is pivoted at its forward end, as at 7a, on the top of the truck parallel to hinge 3. Adjacent its rear end, the rod rides in a slotted plate or saddle 8 mounted on the front frame section 1 to the rear of said draft truck. The assembly of limit rod 7 and saddle 8 allows relative swinging or hinging of the forward end of the front frame section and truck and relieves hinge 3 of lateral strains.

The rear frame section 2 tapers rearwardly in plan and at the back end is supported by a single caster wheel 9. Such rear frame section 2 is disposed with the bottom thereof in a horizontal plane somewhat higher than the bottom of the front frame section, and said sections lap each other longitudinally for approximately one-half their length.

At its forward end the rear frame section 2 is hinged at transversely spaced points 10 in connection with the upstanding transverse center frame of the front frame section 1. Said upstanding transverse center frame is shown in detail in Fig. 3 and includes upper and lower cross bars 11 connected together adjacent the ends by vertical, transversely spaced posts 12. The hinges 10 are fixed in connection with and extend between the vertical posts 12 intermediate the ends of the latter.

The front frame section 1 is supported at its rear end and beneath the rear frame section 2 by means of a pair of transversely spaced, ground engaging wheels 13.

An earth working or scraping blade 14, of heavy-duty construction and of substantial width, extends transversely of the implement adjacent and directly ahead of the rear wheels of the front frame section 1; said blade including forwardly projecting side wings 15 pivoted at their front ends, as at 16, in connection with corresponding side beams 17 of said front frame section. A torque tube 18 coaxial with the pivots 16 extends between the forward end portions of the side wings 15 whereby to prevent twisting or warping of the blade unit.

An adjustable connecting unit, indicated generally at 19, is connected between the blade 14 and the rear frame section 2 substantially centrally of the ends of the latter; said connecting unit 19 being adjustable, as will hereinafter appear in detail, for the purpose of setting the cutting depth of said blade 14.

The adjustable connecting unit 19 comprises a pair of upstanding parallel links 20 pivotally connected between the upper edge portion of the blade 14 and a cross shaft 21. A transversely extending A-frame 22 is likewise pivoted in connection with said cross shaft 21 and extends upwardly thereabout; there being an adjustable tie bolt 23 which connects the upper end of said A-frame 22 with a rocking head 24 having opposed trunnions carried in bearings 25 supported by transversely spaced, facing discs 26. The spaced discs 26 are supported in the rear frame section 2 substantially centrally of the ends of the latter, and some distance above its bottom, by suitable brace members 27.

A fluid pressure actuated power cylinder 28 of double acting type is mounted in the rear frame section 2 directly to the rear of the cross shaft 21, and said power cylinder 28 includes a forwardly projecting piston rod 29 pivotally connected with the cross shaft 21 intermediate its ends. The power cylinder 28 is controlled from the tractor and by the operator thereof through the medium of a valve regulated fluid pressure system, shown in part at 30.

With operation of the power cylinder 28 the links 20 and transverse A-frame 22 may be actuated, as a toggle link assembly, to control and set the vertical working position of the blade 14.

In Figure 4 the rod 29 of the cylinder 28 is shown in retracted postion, with the links 20 and A-frame 22 vertically alined, and at which time the blade 14 is in its lowermost position of adjustment. With buckling or toggle action of the above described connecting unit, the head 24 rocks about the axis of its trunnions, as carried in the bearings 25.

At the back and adjacent opposite ends thereof the blade 14 is fitted with tubular, transversely extending and horizontal land shoes 31 pivotally mounted, as shown, for vertical adjustment; such adjustment being accomplished through the medium of an adjustable link 32 associated with each shoe 31. The shoes are adjusted so that when the blade 14 is in digging position, said shoes ride the ground to prevent the blade from jumping or chattering. In this manner the blade cuts smoothly at all times.

By reason of the embodiment in the implement of separate front and rear frame sections lapped and hinged together as described, the implement can traverse uneven ground, i. e. the wheels 5 or 13 can ride over humps or the like without placing undue strain on the assembly of the frames, and in addition such traversing of uneven ground results in a minimum of variation in the working position of the blade 14.

As the blade 14 is linked to the center of the rear frame section 2 by the connecting unit 19, and as the forward end of said rear frame section is hinged to the front frame section substantially centrally of the ends of the latter, vertical movement of said front frame section resulting from the traversing of uneven ground cannot cause any great variation in the working position of the blade 14.

The described implement is very efficient and practical in operation and can be moved to draw a very fine or accurate level on a given area of ground.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the folowing is claimed as new and useful and upon which Letters Patent are desired:

1. A land leveler comprising an elongated, wheel-supported front frame section, an elongated rear frame section, said frame sections lapping to a substantial extent at adjacent ends, means relatively vertically swingably hinging the rear frame section at its front end to the front frame section, a wheel supporting the rear frame section at its rear end, a transverse scraper blade vertically swingably mounted in connection with the front frame section rearwardly of the front end of the rear frame section, and an upstanding connecting unit extending between the blade and the portion of the rear frame section thereabove.

2. A land leveler comprising an elongated, wheel-supported front frame section, an elongated rear frame section, said frame sections lapping to a substantial extent at adjacent ends, means relatively vertically swingably hinging the rear frame section at its front end to the front frame section, a wheel supporting the rear frame section at its rear end, a transverse scraper blade vertically swingably mounted in connection with the front frame section rearwardly of the front end of the rear frame section, and an upstanding connecting unit extending between the blade and the portion of the rear frame section thereabove; the front frame section being supported at its forward end by a single wheel, and supported at its rear end by a pair of transversely spaced wheels.

3. A land leveler comprising an elongated, wheel-supported front frame section, an elongated rear frame section, said frame sections lapping to a substantial extent at adjacent ends, means relatively vertically swingably hinging the rear frame section at its front end to the front frame section, a wheel supporting the rear frame section at its rear end, a transverse scraper blade vertically swingably mounted in connection with the front frame section rearwardly of the front end of the rear frame section, and an upstanding connecting unit extending between the blade and the portion of the rear frame section thereabove, the wheel support for the front frame section including a wheel mounted draft truck hinged on and supporting the front frame section at its forward end.

4. A land leveler as in claim 3 with means between the front frame section and the draft truck to relieve the hinge means of the latter of side strains while allowing of relative hinging movement in a vertical plane.

5. A land leveler comprising an elongated, wheel-supported front frame section, an elongated rear frame section, said frame sections lapping to a substantial extent at adjacent ends, means relatively vertically swingably hinging the rear frame section at its front end to the front frame section, a wheel supporting the rear frame section at its rear end, a transverse scraper blade vertically swingably mounted in connection with the front frame section rearwardly of the front end of the rear frame section, and an upstanding connecting unit extending between the blade and the portion of the rear frame section thereabove; said connecting unit including vertically extending members pivoted together as a toggle assembly, and power means operatively connected to said toggle assembly.

6. A land leveler comprising an elongated, wheel-supported front frame section, an elongated rear frame section, said frame sections lapping to a substantial extent at adjacent ends, means relatively vertically swingably hinging the rear frame section at its front end to the front frame section, a wheel supporting the rear frame section at its rear end, a transverse scraper blade vertically swingably mounted in connection with the front frame section rearwardly of the front end of the rear frame section, and an upstanding connecting unit extending between the blade and the portion of the rear frame section thereabove; said connecting unit including vertically extending members pivoted together as a toggle assembly, and power means operatively connected to said toggle assembly, said power means being a double acting, fluid pressure actuating power cylinder.

7. A land leveler comprising an elongated, wheel-supported front frame section, an elongated rear frame section, said frame sections lapping to a substantial extent at adjacent ends, means relatively vertically swingably hinging the rear frame section at its front end to the front frame section, a wheel supporting the rear frame section at its rear end, a transverse scraper blade vertically swingably mounted in connection with the front frame section rearwardly of the front end of the rear frame section, and an upstanding connecting unit extending between the blade and the portion of the rear frame section thereabove; said connecting unit comprising longitudinally swingable links pivoted on and upstanding from the blade in spaced relation, a cross shaft to which the upper ends of the links are pivoted, a transverse A-frame pivoted on and upstanding from the cross shaft, means swingably attaching the A-frame at the top of said rear frame section, a double acting power cylinder mounted longitudinally in the rear frame section and operatively connected to the toggle assembly formed by the links and A-frame.

8. A land leveler comprising an elongated wheel-supported front frame section, an elongated rear frame section lapping the front frame section to substantially the center thereof, means hinging the forward end of the rear frame section to the front frame section for relative vertical swinging, the rear frame section being wheel-supported adjacent its rear end, a transverse scraper blade pivoted on the front frame section adjacent its rear end, and a pivotally mounted connecting unit extending between the blade in longitudinally offset relation to its axis, and the portion of the rear frame section thereabove.

9. A land leveler comprising an elongated wheel-supported front frame section, an elongated rear frame section lapping the front frame section to substantially the center thereof, means hinging the forward end of the rear frame section to the front frame section for relative vertical swinging, the rear frame section being wheel-supported adjacent its rear end, a transverse scraper blade pivoted on the front frame section adjacent its rear end, and a pivotally mounted connecting unit extending between the blade in longitudinally offset relation to its axis, and the portion of the rear frame section thereabove; said connecting unit being vertically adjustable.

10. A land leveler as in claim 8 in which the blade is fitted at the rear and adjacent its end with vertically adjustable ground engaging shoes.

11. A land leveler comprising a draft truck adapted to hitch to a tractor, an elongated front frame section relatively vertically swingably hinged at the forward end to the draft truck, an elongated rear frame section relatively vertically swingably hinged to the front frame section intermediate the ends of the latter, wheels supporting said frame sections adjacent the rear ends thereof, and a transverse scraper blade unit mounted on and depending from the front frame section adjacent its rear end; the blade being pivotally mounted, and a connecting unit extending between said blade and the portion of the rear frame section thereabove.

12. A land leveler comprising an elongated frame structure including a front frame section and a rear frame section, means pivotally connecting said sections together for relative vertical motion, wheel means supporting said sections adjacent opposite ends thereof, means adapted to hitch the frame structure at its forward end to a tractor, a transversely spaced pair of wheels supporting the frame structure intermediate its ends, and a transverse scraper blade unit mounted in connection with said frame structure adjacent said pair of wheels, said unit being adjustably suspended from the rear frame section and pivotally connected with the front frame section.

13. A land leveler comprising an elongated frame structure including a front frame section and a rear frame section, means pivotally connecting said sections together for relative vertical motion, wheel means supporting said sections adjacent opposite ends thereof and at an intermediate point between said ends, means adapted to hitch the frame structure at its forward end to a tractor, a transverse scraper blade unit disposed between the wheel means at one end and such intermediate wheel means, means pivoting the scraper blade unit on one frame section, control means for the scraper blade unit, and means connecting the control means between the other frame section and said scraper blade unit.

MARION A. CLARK.

REFERENCES CITED

The following references are of record in the file of this patent:

UNITED STATES PATENTS

| Number | Name | Date |
| --- | --- | --- |
| 1,220,379 | Throop | Mar. 27, 1917 |
| 1,435,575 | Adams | Nov. 14, 1922 |
| 2,124,625 | Marvin | July 26, 1938 |
| 2,333,988 | Demond | Nov. 9, 1943 |